United States Patent [19]
Harris

[11] Patent Number: 5,075,610
[45] Date of Patent: Dec. 24, 1991

[54] SWITCHED RELUCTANCE MOTOR CONTROL CIRCUIT WITH ENERGY RECOVERY CAPABILITY

[75] Inventor: William A. Harris, Coon Rapids, Minn.

[73] Assignee: Honeywell Inc., Minneapolis, Minn.

[21] Appl. No.: 676,613

[22] Filed: Mar. 28, 1991

[51] Int. Cl.[5] .............................................. H02P 5/40
[52] U.S. Cl. ..................................... 318/701; 318/254
[58] Field of Search .............. 318/701, 757, 138, 254, 318/696, 759; 310/168, 193, 216

[56] References Cited

U.S. PATENT DOCUMENTS

| | | | |
|---|---|---|---|
| 3,956,678 | 5/1976 | Byrne et al. | 318/254 |
| 4,387,326 | 6/1983 | Ray et al. | 318/138 |
| 4,520,302 | 5/1985 | Hill et al. | 318/696 |
| 4,611,157 | 9/1986 | Miller et al. | 318/696 |
| 4,684,867 | 8/1987 | Miller et al. | 318/701 |
| 4,772,839 | 9/1988 | MacMinn et al. | 318/696 |
| 4,868,478 | 9/1989 | Hedlund et al. | 318/701 |
| 4,943,760 | 7/1990 | Byrne et al. | 318/701 |

Primary Examiner—William M. Shoop, Jr.
Assistant Examiner—John W. Cabeca
Attorney, Agent, or Firm—William D. Lanyi

[57] ABSTRACT

A control circuit for a switched reluctance motor is provided with a connection between a second end of each stator winding and a first end of an associated other winding. The purpose of this connection is to permit the flow of current from a phase winding to an energy storage device following the disconnection of the phase winding from a primary power source. Because of the inductive characteristic of the phase windings in a switched reluctance motor, the current flow through the winding does not immediately cease when the winding is disconnected from the power source. Instead, the inductive characteristic resists the immediate cessation of current flow following the opening of an associated switch. That continued current flow is directed to an energy storage device, such as a capacitor, for the purpose of raising the voltage at the first, or input, end of another stator winding. This increased voltage potential at the first end of the other stator winding assists the initiation of current flow through that stator winding when its switch is later closed for the purpose of energizing the winding. Alternative embodiments of the present invention include the directing of the continued current flow to more than one other winding to permit bi-directional rotation of the motor rotor.

15 Claims, 9 Drawing Sheets

SWITCHED RELUCTANCE MOTOR CONTROL CIRCUIT WITH ENERGY RECOVERY CAPABILITY

BACKGROUND OF THE INVENTION

1. Field of the Invention:

The present invention is generally related to a control circuit for use with a switched reluctance, or variable reluctance, motor and, more particularly, to a control circuit which has the capability of recovering energy flowing through a stator winding of the switched reluctance motor after a voltage potential has been removed from across the stator winding during the normal operation of the motor.

2. Description of the Prior Art:

In the field of switched reluctance, or variable reluctance, motors, many different types of control systems are known to those skilled in the art. For example, U.S. Pat. No. 4,943,760, which issued to Byrne et. al. on July 24, 1990, discloses a control system for use with a variable reluctance electrical machine. It describes a control system in which the output of a reference wave form generator is applied to a power converter through a current controller. Rotor position, as detected by a sensor, determines the output of the generator. The generator establishes a relative magnitude for rotor phase current for every position of the motor during the period of energization of a motor phase. A further control input may determine the absolute magnitude of the motor phase current, subject to the wave form pattern established by the generator. A method of determining the configuration of a suitable reference wave form for a given motor involves monitoring selected parameters of motor operation while controlling other parameters during a test procedure.

U.S. Pat. No. 4,520,302, which issued to Hill et. al. on May 28, 1985, discloses a stepping motor which has phase windings wherein the current through the phase windings is switched by a drive circuit including switching transistors in series with each individual phase winding. The transistors are controlled by a phase sequence logic circuit and a current flow characteristic is used to indicate the rotor position. The current flow characteristic is used to operate the phase sequence logic circuit. One embodiment of this control circuit incorporates a drive circuit that includes a chopper-type control operated through additional transistors in series with each phase winding. This drive circuit may alternatively provide a constant voltage power supply to the phase windings in sequence with current being repeatedly switched at a low level to an unenergized winding to monitor rotor position.

U.S. Pat. No. 4,611,157, which issued to Miller et. al. on Sept. 9, 1986, discloses a switched reluctance motor drive operating without a shaft position sensor. The switched reluctance motor is operated without requiring a shaft position sensor and the circuit of this patent allows dynamic increase of the torque margin as the dwell angle of the phase circuits is changed in response to a change in load torque. Average current supplied by the DC link is sensed as a measure of load torque and is used to control the dwell angle.

U.S. Pat. No. 4,772,839, which issued to MacMinn et. al. on Sept. 20, 1988, describes a rotor position estimator for a switch reluctance motor. The indirect position estimator described in this patent is for a switched reluctance motor and it applies short duration, low level sensing pulses to two energized phases of the motor. A change in the phase current during a sampling period, resulting from the application of the sensing pulse, is sensed and processed to produce an indication of a pair of estimated angles for each of the unenergized phases. A pair of phase angles for one such unenergized phase is shifted by a value equal to the phase displacement between the two unenergized phases and the shifted angles are then compared to the angles of the second phase to determine which angles match. The matching angle is produced as a signal indicative of the estimated instantaneous rotor position.

U.S. Pat. No. 4,868,478, which issued to Hedlund et. al. on Sept. 19, 1989, discloses a motor energizing circuit for a reluctance motor having at least two phases. A sensing and control circuit is constructed to indicate the inductance or a clearly related magnitude in the winding in the phase which is next to be energized or activated. The circuit is also constructed to detect the current in the winding in the energized phase and to correct the indicated value of the inductance or related magnitude with an operating parameter which has a dependency on the current value in the winding of the energized phase and to compare this corrected value with a reference value and to utilize the rotational position of the motor rotor, when the corrected value coincides with the reference value, as a starting point for determining a rotational position for changing the energizing state of the phase winding.

The patents described above, and many other patents and technical articles known to those skilled in the art, indicate the extent to which different control circuits have been designed to control the operation of variable reluctance, or switched reluctance, motors. Depending on the particular intended use of the variable reluctance motor, a wide variety of control circuits are available. However, because of the way a switched reluctance motor operates, and because of the inductive characteristic of its phase windings, a certain amount of energy is wasted during the sequential energization and deenergization of a stator winding. Depending on the particular control algorithm used to operate the switched reluctance motor, the induced current flowing through an energized stator winding is generally discontinued as a rotor pole moves into alignment with the stator pole associated with the stator winding. Otherwise, the magnetic attraction provided by the energized stator pole would actually inhibit the rotation of the rotor past its alignment position. When a voltage potential is disconnected from the energized stator winding, the inductive characteristic of the stator winding resists a sudden cessation of current flow through it. The current continues to flow and diminishes at a rate determined as a function of the inductance of the stator winding. Various techniques are used to accommodate this inductive characteristic, including the provision of alternative secondary circuits that permit the continuing current flow to recirculate and dissipate. It should be realized that any type of accommodation made for this continued current wastes energy unless the current is used in some way to assist the continued rotation of the rotor. It would therefore be helpful if some method or apparatus is provided to utilize this continuing current that results from the inductive characteristic of the switched reluctance motor windings, especially if the motor is used in conjunction with an apparatus, such as an automobile, where increased efficiency can directly reduce fuel consumption. The present invention provides a control circuit that utilizes this continuing current that flows after the phase winding is disconnected from a voltage potential. The present invention, which will be described in greater detail below, utilizes the continuing current to charge a device which stores the energy for later use in energizing another stator winding of the switched reluctance motor.

SUMMARY OF THE INVENTION

The present invention provides a control circuit for use with a switched, or variable, reluctance motor. It can be adapted for association with switched reluctance motors with any number of stator pole pairs. It is capable of connecting a voltage potential across a stator winding of the motor and alternately connecting and disconnecting one end of the stator winding to a connection point of ground potential while the other end of the stator winding is connected to a voltage source. When connected in this manner, a current is caused to flow through the stator winding for the purpose of creating a magnetic field at the stator pole and, in turn, creating a magnetic attraction to induce movement of a rotor pole toward that magnetized stator pole. By sequentially connecting and disconnecting the stator windings of the switched reluctance motor in an appropriately selected sequence, the rotor of the switched reluctance motor can be caused to turn at a preselected rotational speed.

The primary advantage of the present invention is that it provides an advantageous current path for a current flowing through a stator winding after that winding has been disconnected from the primary power supply circuit. In this way, the present invention recovers the energy provided by the disconnected stator winding and makes that energy available for use by another stator winding.

As will be described in greater detail below, the control circuit of the present invention comprises a first means for connecting a first end of a first stator winding in electrical communication with a voltage source. It also comprises a second means for connecting a first end of a second stator winding in electrical communication with that voltage source. Although the present invention is applicable for use with switched reluctance motors of many different numbers of pole pairs, it will be primarily described herein in terms of two specific stator winding pairs and their interaction caused by the circuitry of the present invention.

A preferred embodiment of the present invention also comprises first and second means for alternately connecting and disconnecting a second end of the first and second stator windings, respectively, to a connection point of ground potential. When a stator winding is connected to the connection point of ground potential, a current is caused to flow through the stator winding by the primary voltage source and the completed circuit that is provided by the connection of the first end of the stator winding to the voltage source and the connection of the second end of the stator winding to the connection point of ground potential.

In addition, for each stator winding pair of the switched reluctance motor, the present invention also provides a means for conducting an electrical current from the second end of the stator winding pair to a first end of another stator winding pair. The stator winding pairs of the switched reluctance motor are also referred to herein as a stator winding. These terms should be understood to be equivalent in the description below. Each of the stator windings is additionally provided with a means for storing a voltage potential at its first end. This storing means comprises a capacitor in a preferred embodiment of the present invention and the capacitor stores the energy provided by the current flowing through the conducting means after a second end of the stator winding is disconnected from the point of ground potential. This continuing current flow, following the disconnection of the second end of the stator winding, is caused by the inductive characteristic of the stator winding which resists a sudden cessation of current flow following the removal of a ground potential across the stator winding.

In a preferred embodiment of the present invention, a Zener diode is connected in electrical communication between the first end of the stator winding and a voltage source. In addition, a diode is connected in electrical communication with the conducting means between the second end of a stator winding and the first end of the other stator winding.

This type of connection scheme is applied to each stator winding pair of the switched reluctance motor. In other words, if each stator winding is described as having a first end into which current flows from a power source and a second end from which current flows out of the stator winding toward a connection point of ground potential, each winding is provided with a means through which current can flow from the second end of the stator winding to the first end of another stator winding. The current flow through this conducting means occurs after the second end of a stator winding is disconnected from the point of ground potential. The current flowing through this conducting means toward the first end of another winding is caused by the inductive characteristic of the stator winding which continues to cause a current to flow through the winding after its second end is disconnected from ground potential. As the current flows through this conducting means of the present invention, it flows toward the energy storage element, such as a capacitor, which is connected in electrical communication with the first end of another stator winding. This raises the voltage potential at the input, or first end, of that other winding.

It should be clearly understood that the present invention does not require a switched reluctance motor connected to its control circuit. Instead, the control circuit of the present invention is intended to be associated with a switched reluctance motor for the purpose of controlling the operation of switched reluctance motor in a manner which recovers energy from one stator pole winding for use by another stator pole winding so that the energy consumption of the motor can be reduced and the operation of the switched reluctance motor can be conducted in a more efficient manner. Viewed in this way, the present invention can be considered as comprising first and second connection points which are connectable to first and second termini of each stator winding of the switched reluctance motor. It also comprises means for connecting one end of each stator winding to a voltage source and, in addition, the present invention comprises a means for connecting and disconnecting each stator winding with a connection point of ground potential. In addition, the present invention comprises a means for conducting current from one end of a stator winding to an alternative end of another stator winding. As described above, the present invention also comprises a voltage storage means which is connectable in electrical communication with one end of each stator winding for the purpose of storing energy that flows toward that stator winding from another stator winding through the conducting means.

BRIEF DESCRIPTION OF THE DRAWINGS

The present invention will be more fully understood through a reading of the description of the preferred embodiment in association with the drawings, in which.

DESCRIPTION OF THE PREFERRED EMBODIMENT

Throughout the description of the preferred embodiment, like components will be identified with like reference numerals.

Figure 1:
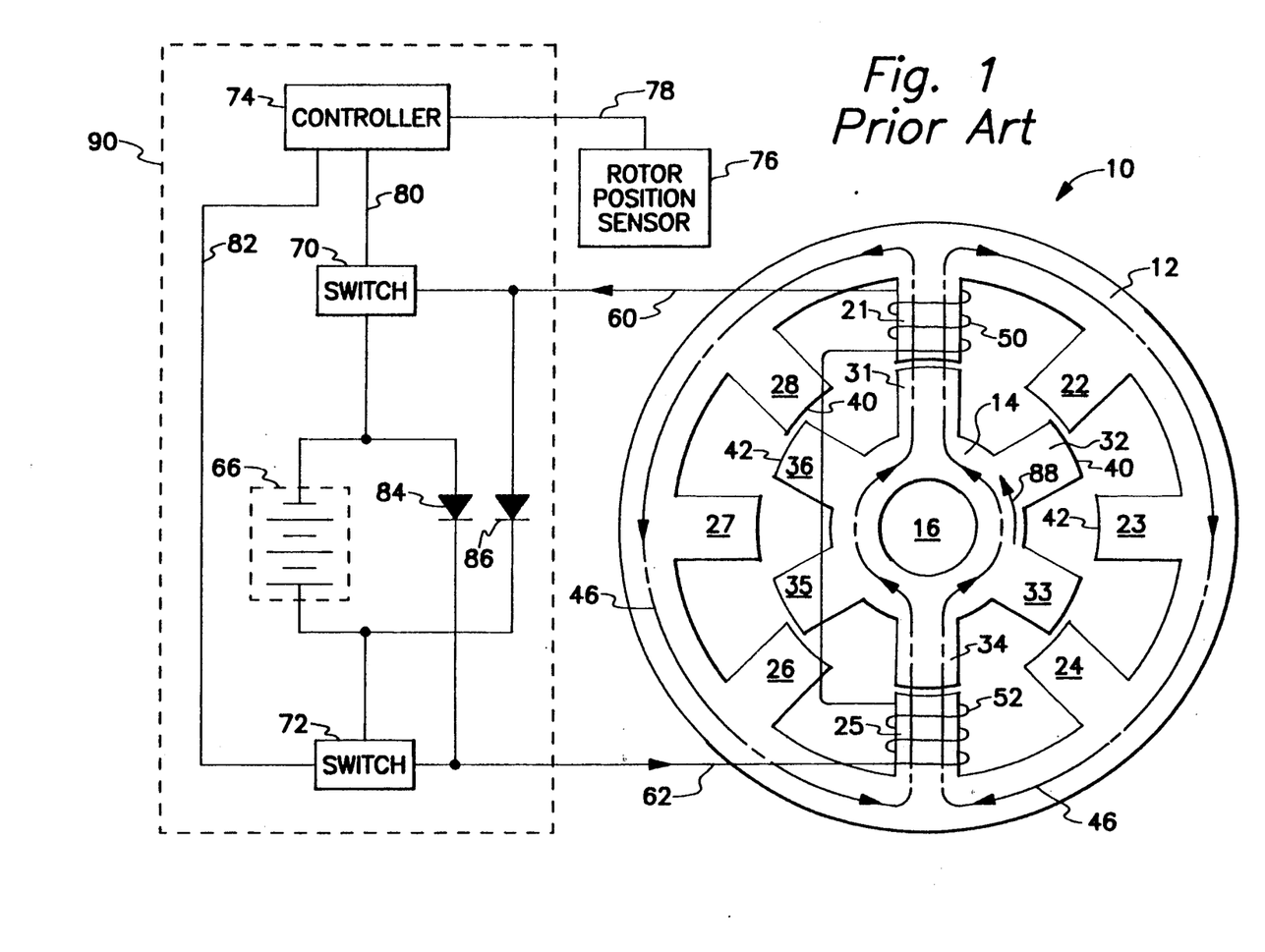
FIG. 1 shows a control circuit for a switched reluctance motor which is known to those skilled in the art.

FIG. 1 shows a switched reluctance motor associated with a control circuit that is known to those skilled in the art. The purpose of FIG. 1 is to illustrate the general operation of a switched reluctance motor and to identify several basic concepts that will be discussed below in conjunction with the description of the alternative embodiments of the present invention.

In FIG. 1, reference numeral 10 is used to generally identify the schematic illustration of a switched reluctance motor. The motor 10 comprises a stator 12 and a rotor 14 connected to a shaft 16. As can be seen, both the stator 12 and the rotor 14 each comprise numerous salient poles. The stator poles are identified by reference numerals 21-28 and the rotor poles are identified by reference numerals 31-36. The stator comprises eight poles while the rotor comprises six poles. The stator poles are associated in pairs to create four phases. Salient stator poles 21 and 25 are associated together to form one pole pair, or phase, of the four phase motor in FIG. 1. These associated poles are generally connected by a single conductor that forms the two stator windings of the phase. The stator windings 50 and 52 are illustrated in FIG. 1 as being connected together in electrical communication with each other and this pair of stator windings is also shown being connected to a control circuit 90 which comprises a voltage source 66. The schematic diagram of FIG. 1 shows conductors 60 and 62 providing power to the illustrated windings 50 and 52, respectively.

In most switched reluctance motors, the outer surfaces of the salient rotor poles are shaped to be associated in a concentric association with the inner surfaces of the salient stator poles. In most applications, a very small clearance is provided between these surfaces which are identified by reference numerals 40 and 42.

When a current is caused to flow through conductors 60 and 62, the stator windings 50 and 52 create a magnetic field such as that illustrated by the exemplary lines of flux identified by reference numeral 46. The creation of this magnetic field attracts the salient rotor pole which is most proximate the magnetized stator pole. In this particular example, rotor poles 31 and 34 are magnetically attracted toward alignment with stator poles 21 and 25, respectively. Alternatively, if stator poles 22 and 26 were caused to create a magnetic field by the flow of electrical current through their associated stator windings (not shown in FIG. 1), the resulting magnetic attraction would attract rotor poles 32 and 35 toward alignment with stator poles 22 and 26, respectively. This would result in a rotation of rotor 14 in the direction indicated by arrow 88. Naturally, if stator poles 22 and 26 were energized in this manner, it would be appropriate to de-energize stator windings 50 and 52 to eliminate the magnetic attraction that would tend to hold rotor poles 31 and 34 in the position shown in FIG. 1.

The control circuit 90, in circuits generally known to those skilled in the art, comprises a voltage source 66 and a pair of switches, 70 and 72, which are controlled by the controller 74 with signals conducted through lines 80 and 82. The controller selectively opens and closes switches 70 and 72, or other switches associated with other phases, in response to a preselected sequential pattern and in response to signals received on line 78 from a rotor position sensor 76. It should be understood that when a stator winding pair, such as that indicated by reference numerals 50 and 52 in FIG. 1, is energized with a current flowing through it, the inductive characteristic of the stator winding will tend to resist a sudden cessation of current flowing through the winding when it is disconnected from the voltage source 66. In typical control applications, alternative circuits such as those shown in FIG. 1 in association with diodes 84 and 86, are provided to permit the induced current flow to circulate after the stator winding is disconnected from the power source. The operation of control circuit 90 shown in FIG. 1 will not be described in greater detail because of its generally known characteristics.

Figure 2:
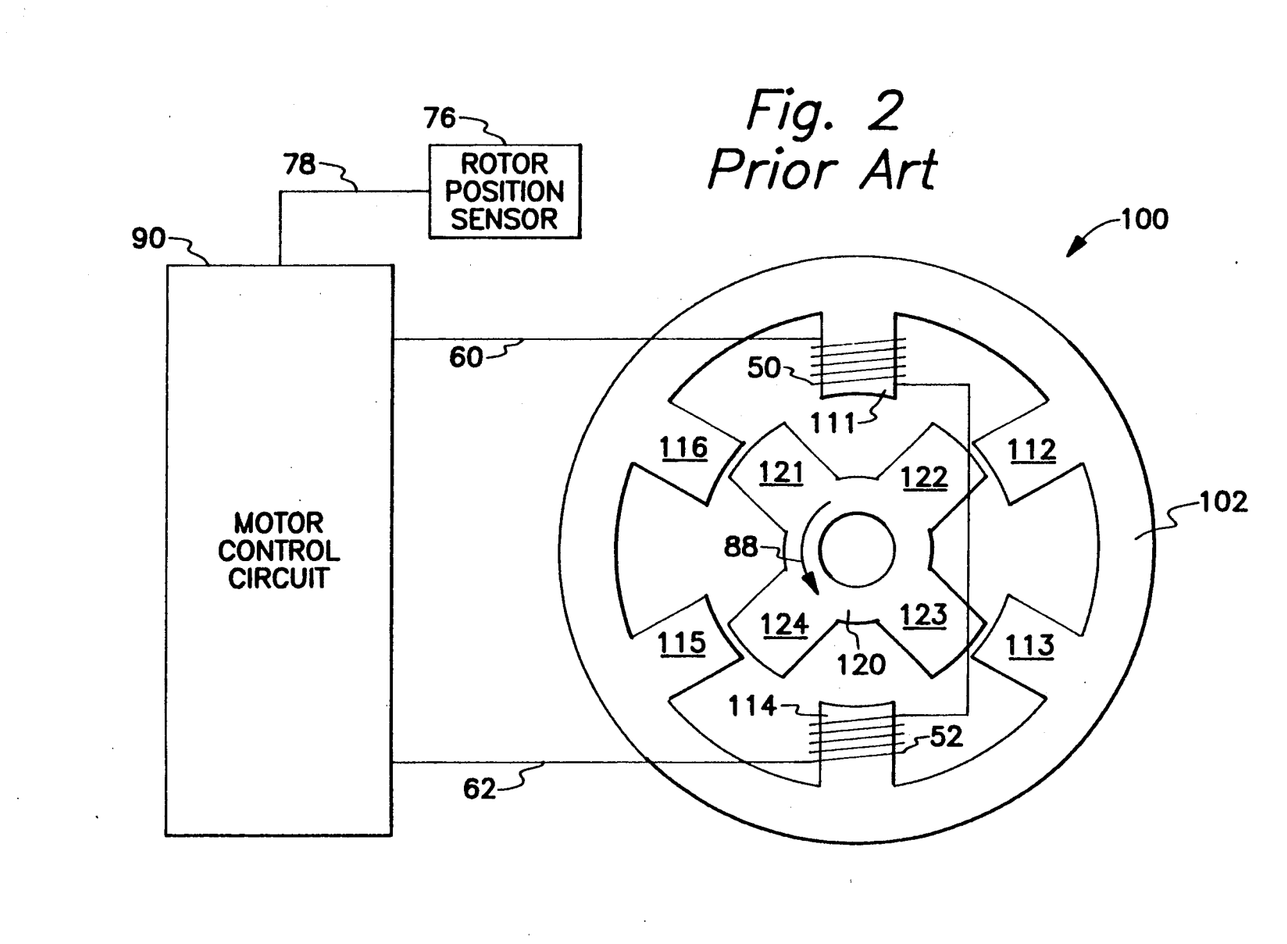
FIG. 2 shows a known control circuit connected to an alternatively configured switched reluctance motor.

The motor control circuit 90 shown in FIG. 1 is also illustrated in a simplified manner FIG. 2 in conjunction with rotor position sensor 76 and the line 78 through which the motor control circuit 90 obtains information from the position sensor 76. The purpose of FIG. 2 is to illustrate another configuration of a switched reluctance motor. The motor identified by reference numeral 100 in FIG. 2 is generally similar to the motor 10 shown in FIG. 1, but with a different number of stator and rotor poles. As shown in FIG. 2, the motor 100 comprises a stator 102 that is shown having six stator poles 111-116. The motor 100 is also shown having a rotor 120 that comprises four rotor poles 121-124. One of the three phases, or pairs of stator poles, is shown with its stator windings 50 and 52 and the lines, 60 and 62, which connect that pair of stator windings with the control circuit 90. It should be understood that, like the illustration of FIG. 1, the stator poles of the motor 100 in FIG. 2 are each connected in pairs with suitable stator windings that are provided with electrical current by the control circuit 90. In both FIGS. 1 and 2 only one pair of stator windings 50 and 52 is illustrated for the purposes of simplicity and clarity. It should be understood that if windings associated with stator poles 113 and 116 in FIG. 2 are provided with an electrical current flowing through them, the resulting magnetization would attract rotor poles 121 and 123 and would result in a rotation of the rotor 120 in the direction indicated by arrow 88. Therefore, the operation of motor 100 in FIG. 2 is generally similar to that of motor 10 in FIG. 1 with the exception that the number of stator poles and rotor poles is different and the motor control circuit 90 would be appropriately configured to adapt to this difference.

Figure 3:
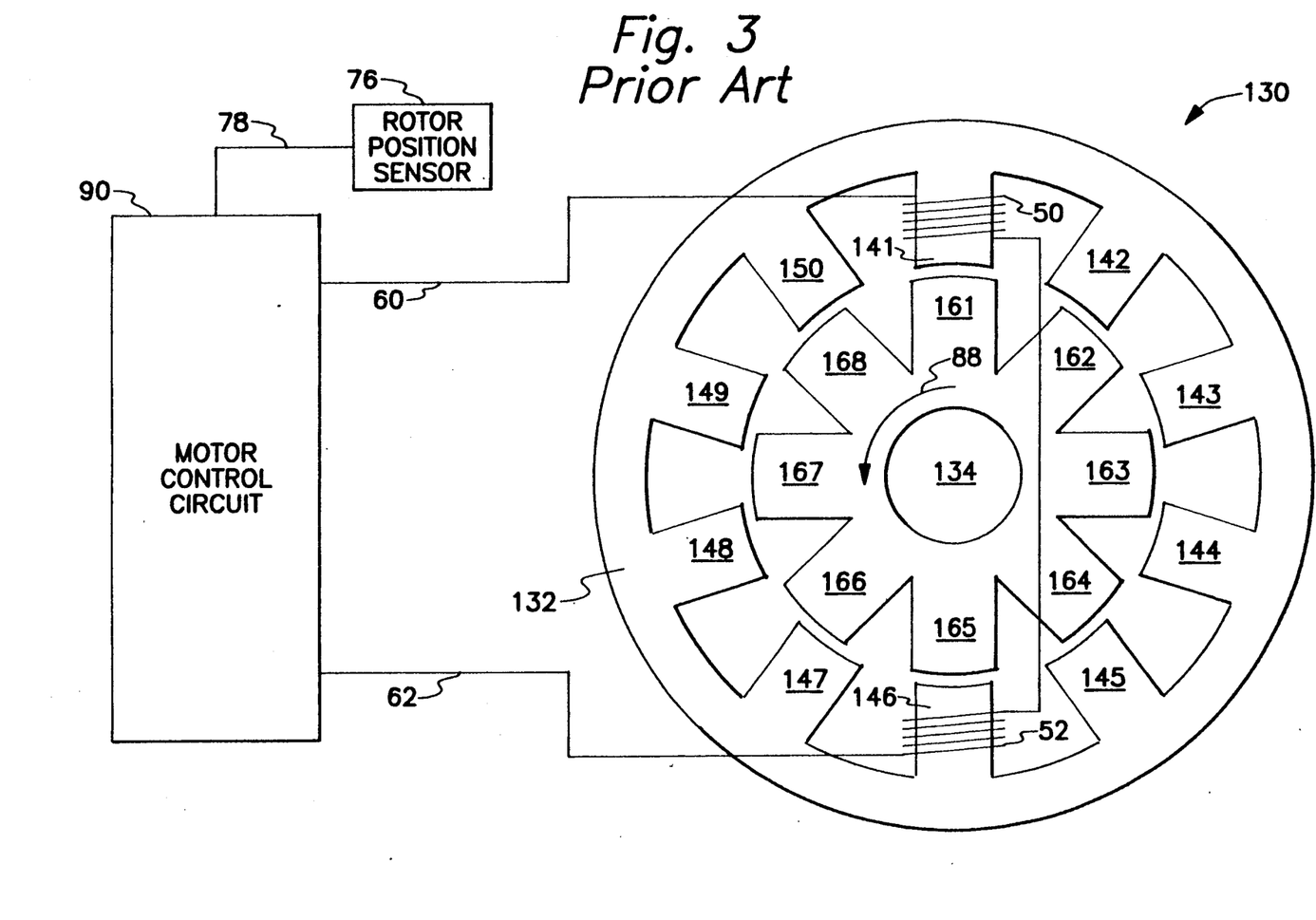
FIG. 3 shows a known control circuit configuration connected to a switched reluctance motor which is configured in a manner slightly different from the motors shown in FIGS. 1 and 2.

FIG. 3 is generally similar to FIGS. 1 and 2, but with a switched reluctance motor 130 which has a different number of stator poles. As can be seen, the motor 130 is provided with 10 salient stator poles 141–150 and the rotor 134 is provided with eight salient poles 161–168. As in FIGS. 1 and 2, only one pair of stator poles is shown having stator windings 50 and 52, but it should be understood that each pair of stator poles is provided with a stator winding. It should also be understood that if the windings associated with stator poles 143 and 148 are energized with an electrical current flowing through them, the resulting magnetic field would attract rotor poles 162 and 164 and cause the rotor 134 to rotate in the direction indicated by arrow 88.

FIGS. 1–3 each illustrate a different configuration of a switched reluctance motor associated with a known type of motor control circuit. These illustrations differ in the number of stator and rotor poles provided in their respective switched reluctance motors. However, each of the motors shown in FIGS. 1–3 are well known to those skilled in the art as is the motor control circuit 90. Known types of control circuits generally provide a means through which an induced current can flow in a recirculating manner after an associated pair of stator windings is disconnected from the primary power source. This recirculating path is necessary because of the inductive characteristic of the stator winding and its resistance to sudden termination of current flow through it.

Figure 4:
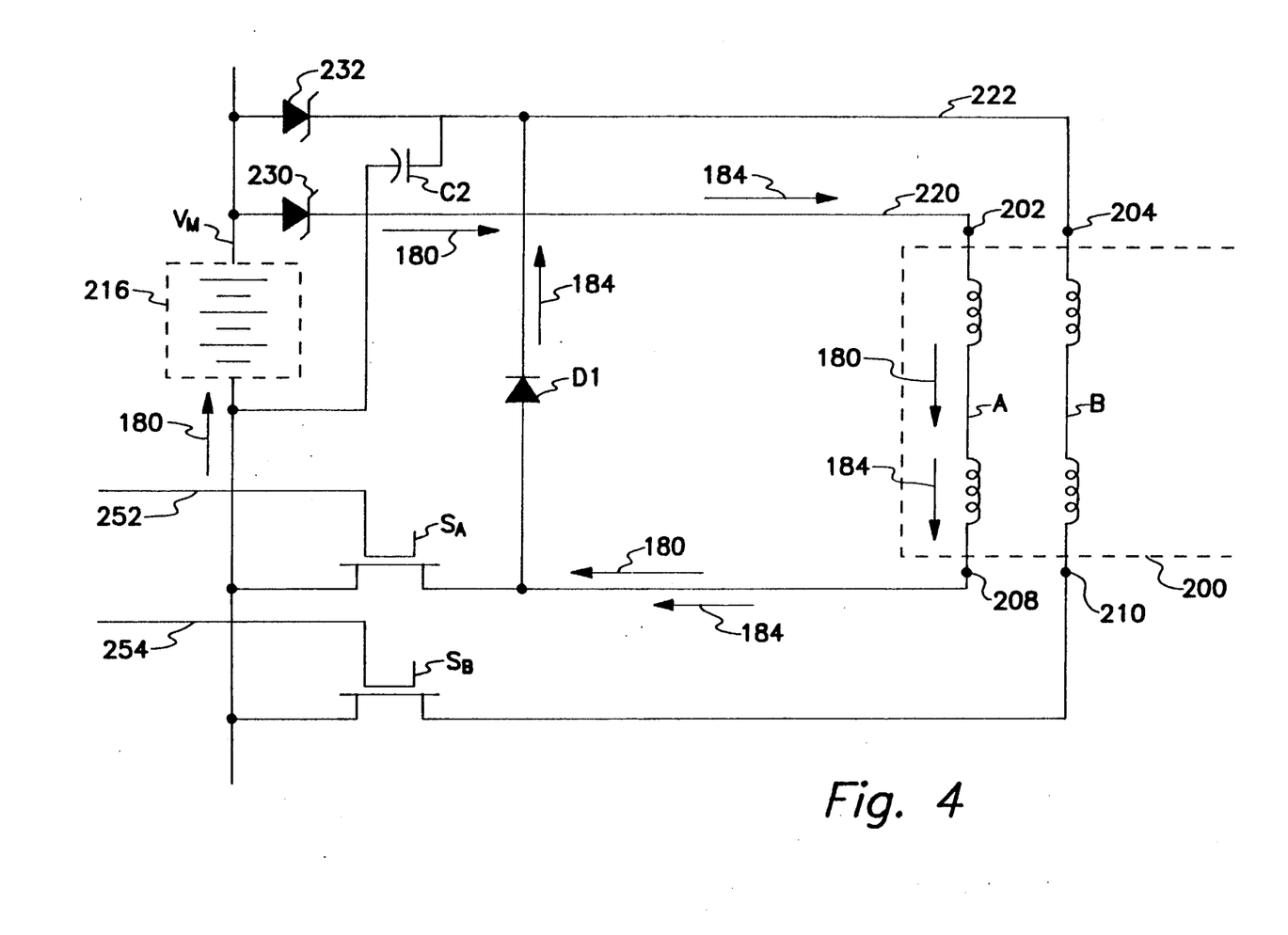
FIG. 4 shows a control circuit made in accordance with the present invention.

The most significant difference between the present invention and the known motor control circuits described above will be illustrated in conjunction with FIG. 4 which is a simplified partial schematic of a control circuit made in accordance with the present invention. For purposes of simplicity, FIG. 4 only shows two stator winding pairs, A and B, and the control circuitry associated with those two winding pairs. However, it should be understood that the motor 200 can comprise many different numbers of winding pairs within the scope of the present invention. A voltage source 216 is illustrated in FIG. 4 as being connectable in electrical communication with each of the stator windings. It should be clearly understood that the voltage source 216 is intended to generically represent any one of the numerous types of power supplies that can be used to provide power to a switched reluctance motor instead of representing any specific type of power source such as a battery. In addition, it should be understood that the switches $S_A$, $S_B$, $S_C$ and $S_D$, in FIGS. 4, 5, 7, 8 and 9, are not limited to any particular type of switch but, instead, can be any type of on/off solid state switch in a performed embodiment of the present invention. Switches $S_A$ and $S_B$ are shown connected to the stator windings A and B in FIG. 4.

For purposes of this description, a first connection point 202 and a second connection point 204 are shown as being connectable to first ends of the two stator windings. In addition, third and fourth connection points, 208 and 210, are shown being connectable in electrical communication with second ends of the two stator windings. Reference numeral 200 is used to generally represent a switched reluctance motor. For purposes of this description, it will be assumed that switch $S_A$ is initially closed and switch $S_B$ is open. When switch $S_A$ is closed, a completed current path is provided from the voltage source 216 through Zener diode 230 and connection point 202. The path continues through stator winding pair A, connection point 208 and switch $S_A$, returning to the ground potential point of the voltage source 216. The current path is indicated by arrows 180 in FIG. 4. The current path indicated by arrows 180 provides the electrical current through stator winding A which, in turn, creates the magnetic field necessary to attract a pair of rotor poles as described above in conjunction with the operation of the motors in FIGS. 1–3. With switch $S_B$ remaining open, the opening of switch $S_A$ interrupts the current path through which the current, as indicated by arrows 180, passes. However, the inductive characteristic of stator winding A resists the sudden cessation of current flowing through it. This inductive characteristic will tend to cause current to continue to flow even after switch $S_A$ is opened to deprive it of its voltage potential and normal path. The present invention provides a means for conducting an electrical current from the second end of phase winding A, at connection point 208, to a connection point that is connected in electrical communication with a first end of phase winding B. That conducting means is the conductor shown having diode D1 connected in electrical communication with it. This conducting means provides a path for current to flow in the directions indicated by arrows 184. Therefore, after switch $S_A$ is opened, the current which continues to flow through phase winding A passes along the path indicated by arrows 184 toward a means for storing energy which, in FIG. 4, is represented by the capacitor C2 that is connected in electrical communication with connection point 204 at a first end of phase winding B. The current flowing from the second end of phase winding A through diode D1 toward capacitor C2 charges capacitor C2 and permits the capacitor to store the energy that would otherwise be lost following the opening of switch $S_A$. The storage of energy in capacitor C2 raises the voltage potential at connection point 204. When switch $S_B$ is closed to connect the second end 210 of phase winding B in electrical communication with the ground potential point of voltage source 216, this increased voltage potential at connection point 204 will assist the initiation of current flow through phase winding B and take advantage of the stored energy of capacitor C2.

With continued reference to FIG. 4, it can be seen that the provision of the conducting means connected between the second end of phase winding pair A and the first end of phase winding pair B improves the operation of the control circuit by allowing the recovery of energy from the current flowing through phase winding A after switch $S_A$ is opened and directing that energy to assist in the initial flow of current through phase winding B when switch $S_B$ is later closed. It should be understood that FIG. 4 is only a partial illustration of a larger control circuit that would generally be used in association with a switched reluctance motor. However, FIG. 4 shows the primary advantage of the present invention in association with one selected pair of phase windings, A and B, of an N phase machine.

Figure 5:
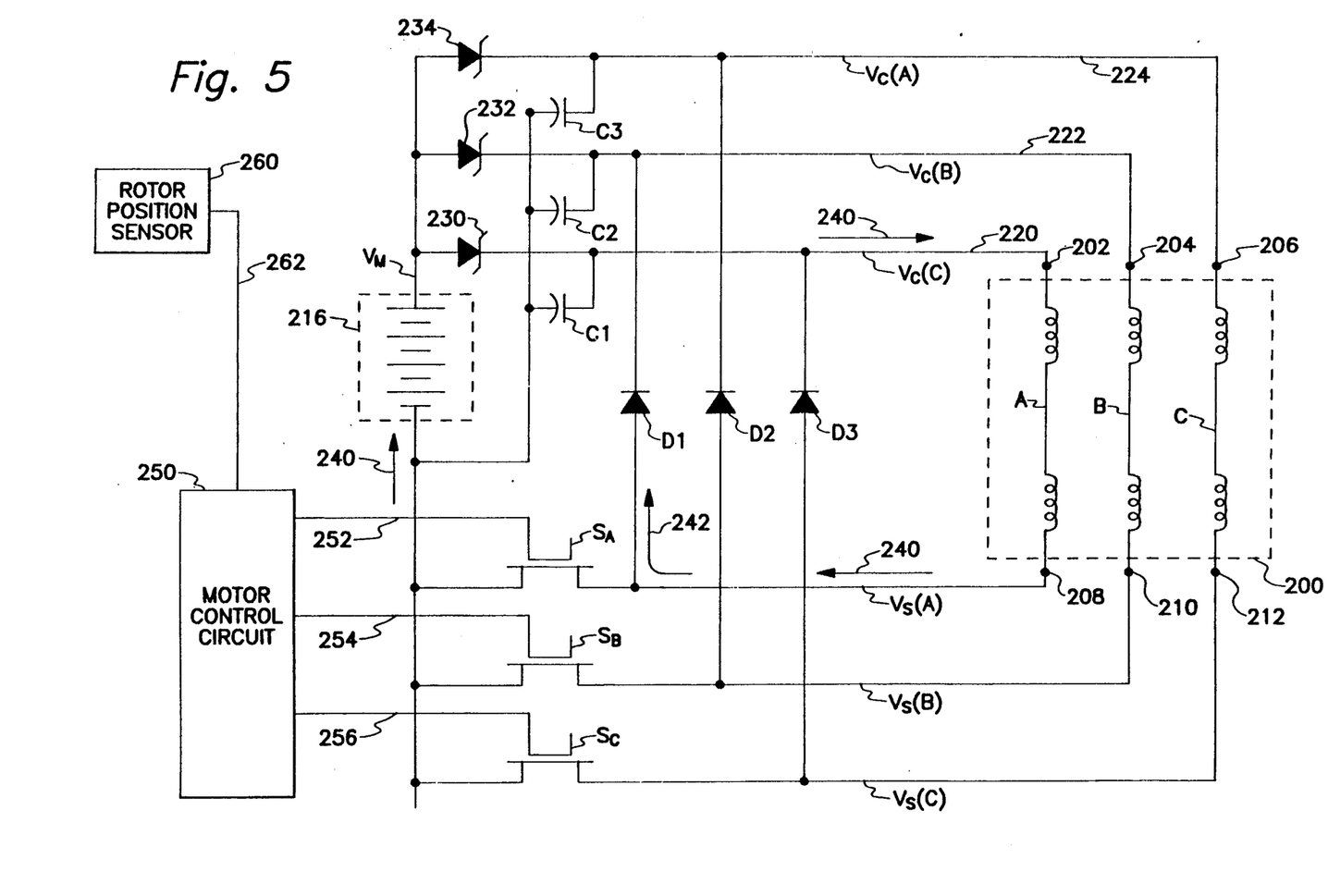
FIG. 5 shows one embodiment of the present invention for use with a three phase stator winding.

FIG. 5 shows an application of the present invention in association with a three phase switched reluctance motor 200. The three phases, A, B and C, are illustrated within a dashed box 200 to represent the phase windings of a three phase motor. Connection points 202, 204 and 206 are shown being connectable to first ends of the windings. Connection points 208, 210 and 212 are shown being connectable to second ends of those same phase windings. For purposes of clarity, the upper ends of each phase winding, where current would flow into the phase windings, are referred to herein as the first ends of those windings and the lower ends of the phase windings shown in FIG. 5 are referred to as the second ends. Connection points 202, 204 and 206 provide a means for connecting the phase windings in electrical communication with a voltage source 216. Connection points 208, 210 and 212 provide a means for connecting the second ends of the stator windings in alternately connected and disconnected association with a point of ground potential. The specific means for alternately connecting and disconnecting the second ends of the windings to the ground potential also comprises switches $S_A$, $S_B$ and $S_C$ as shown which, in a preferred embodiment of the present invention, are solid state switches. A motor control circuit 250 is connected to each of the switches, through lines 252, 254 and 256, to selectively close and open the switches. It should be understood that many different types of control circuits 250 and many different algorithms can be used in association with the present invention. The motor control circuit 250 is also shown connected in signal communication with a rotor position sensor 260 by line 262. In actual practice this sensor may be a component such as an optical encoder or a resolver or any of the remote sensing methods known to those familiar with the art.

Each of the stator windings in FIG. 5 is provided with a means for conducting a current from the second end of the stator winding to a first end of another stator winding. These conductive paths are illustrated in FIG. 5 with diodes D1, D2 and D3 connected in electrical communication with each of the conducting means. In addition, each of the stator windings is provided with a means for storing the voltage potential in electrical communication with it. These storing means are represented by capacitors C1, C2 and C3. In addition, Zener diodes 230, 232 and 234 are connected in electrical communication between the voltage source 216 and the first ends of each stator winding.

With continued reference to FIG. 5, it can be seen that if switch $S_A$ is closed, a current will be caused to flow from the voltage source 216 through Zener diode 230 toward connection point 202. The current will continue to flow through phase A toward connection point 208 and the source of switch $S_A$. It should be understood that, in the drawings and the discussion herein, the switches are described as Field Effort Transistors. The FET configuration is used for convenience and should not be considered a limitation of the present invention. The present invention could be implemented with any suitable on/off solid state switch. The current will then flow through switch $S_A$ toward the point of ground potential at the voltage source 216. This flow of current is represented by arrows 240 in FIG. 5. If switch $S_A$ is then opened by the motor control circuit 250, the inductive characteristic of phase winding A will resist the sudden cessation of current flow even though the primary current path described above is open. Because the present invention provides a means for conducting current from the second end 208 of phase winding A to the first end 204 of phase winding B, the current can continue to flow through diode D1 toward capacitor C2 as illustrated by arrows 242. This continued current flow after switch $S_A$ is opened will charge capacitor C2 and store the energy that would otherwise be lost if the circuit was only provided with a means for permitting the current to recirculate and dissipate following the opening of switch $S_A$. This flow of current, as indicated by arrows 242, toward capacitor C2 charges capacitor C2 and raises the voltage potential at connection point 204 above that which would normally result if the current path with diode D2 was not provided. This raising of the voltage potential at connection point 204 assists the initiation of current flow through phase B when switch $S_B$ is eventually closed in response to a command from the motor control circuit 250 on line 254.

The operation described above in conjunction with phases A and B and switches $S_A$ and $S_B$ is similar to the operation that would take place in association with any other similarly associated pair of phase windings shown in the three phase motor 200 of FIG. 5. In other words, each of the second ends of the phase windings is provided with an individual means for conducting current from that second end toward the first end of another associated phase winding.

For a further understanding of the operation of the present invention, several selected points are identified in FIG. 5 for continued reference during the discussion below related to FIG. 6 which is a timing diagram of the operation of the circuit in FIG. 5. Those selected circuit points are identified in FIG. 5 as $V_S(A)$, $V_C(B)$, $V_S(B)$, $V_C(C)$, $V_S(C)$ and $V_C(A)$. In addition, the timing diagram of FIG. 6 will describe the operation of the present invention by describing the changing voltage potentials at the source end of switches $S_A$, $S_B$ and $S_C$ and the voltage potential at the capacitors, C1, C2 an C3, which are identical to the voltage potentials at the first ends, 202, 204 and 206, of the associated stator windings.

Figure 6:
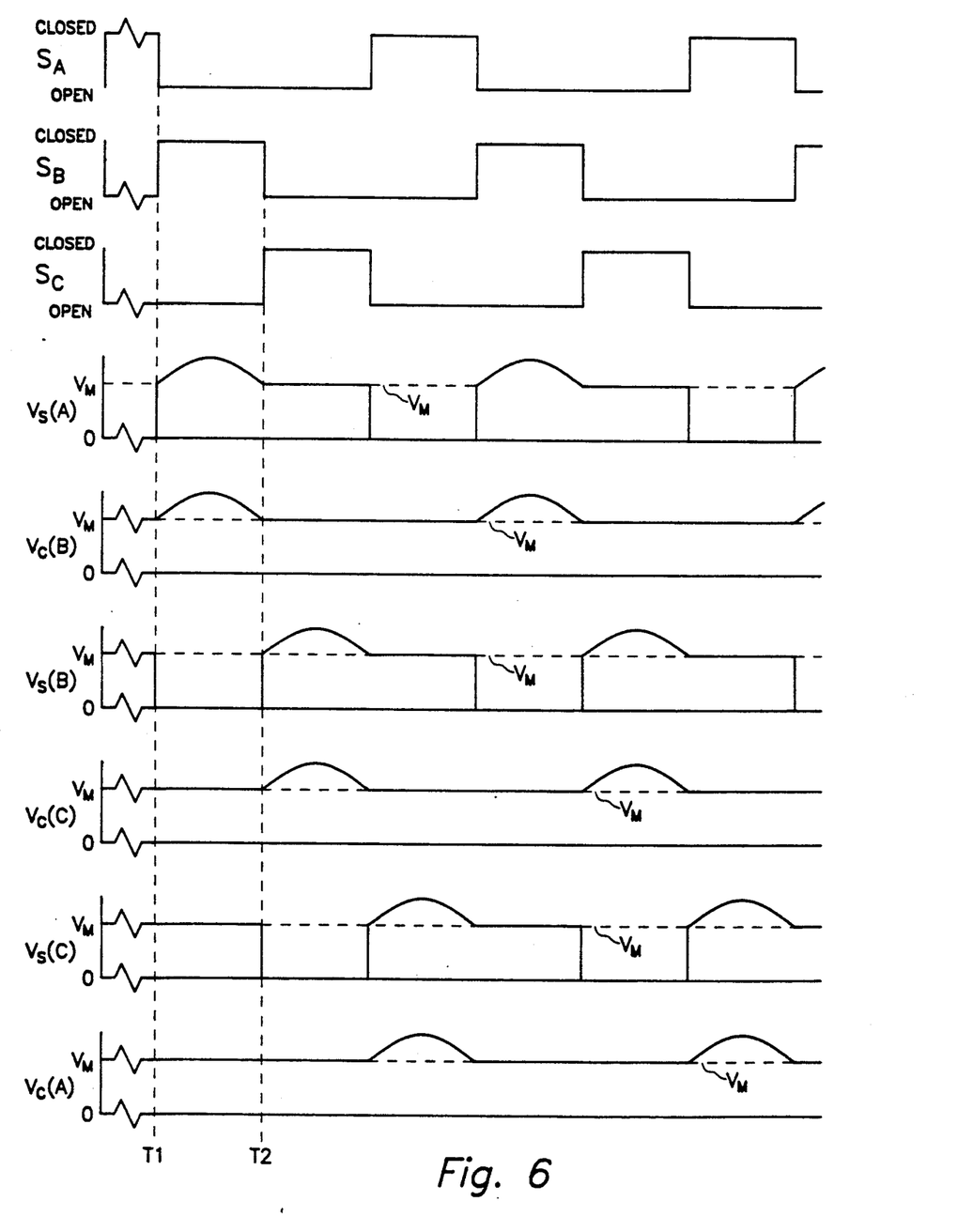
FIG. 6 is a timing diagram associated with the circuit of FIG. 5.

At the top portion of FIG. 6, the status of each of the switches, $S_A$, $S_B$ and $S_C$, is shown as representing the open or closed position of each switch. In the lower portion of FIG. 6, the voltage potential at several points identified in FIG. 5 are illustrated. It should be understood that the precise magnitude of the illustrated voltage potentials are not critical to the present invention and will vary from application to application, depending on the voltage source used and the types of components included in the control circuit. The pattern of the timing diagram shown in FIG. 6 is intended only to show relative magnitudes of voltage potential at various circuit points and to illustrate the timing relationships of changes in those voltage potentials.

The timing diagram in FIG. 6 begins at the left portion of the illustration with switch $S_A$ on and switches $S_B$ and $S_C$ in the off, or open, condition. Because of the closed status of switch $S_A$, voltage $V_S(A)$ at the source end of switch $S_A$ is zero because that switch is closed, connecting point 208 to the ground point of the voltage source 216. The other two switches, $S_B$ and $S_C$, are opened, and therefore, the source ends of those switches are at a potential equivalent to the operating voltage $V_M$ of the voltage source 216. This is indicated by timing diagrams $V_S(B)$ and $V_S(C)$.

With continued reference to FIGS. 5 and 6, T1 in FIG. 6 represents the time at which Switch A is opened and Switch B is closed. Voltage $V_S(A)$ immediately rises to the operating voltage of the motor provided by the voltage source 216. It then continues to rise because of the increased voltage potential at capacitor C2 resulting from the flow of current through diode D1 as indicated by arrows 242. That continued current flow raises the potential at capacitor C2 and at connection point 204. As can be seen in FIG. 5, this increased voltage potential $V_S(A)$ also exists at the source end of switch $S_A$. This rise in voltage is represented by the bulge that extends above dashed line $V_M$ in the timing diagram identified as $V_S(A)$ in FIG. 6. The flow of current through diode D1 to capacitor C2 continues as a current begins to flow through phase winding B. Because of the inductive characteristic of phase winding B, the existence of a voltage potential across connection points 204 and 210 does not immediately create a current flow through phase winding B. However, the increased voltage at capacitor C2 assists the initiation of that current flow through phase winding B. When that current flow begins, the bulge shown in timing diagram $V_S(A)$ falls to the level indicated by dashed line $V_M$. In FIG. 6, the voltage potential at the source of switch $S_B$ is represented by timing diagram $V_S(B)$, and, as shown, this voltage drops to ground potential when switch $S_B$ is closed.

At time T2, as shown in FIG. 6, switch $S_B$ is opened and switch $S_C$ is closed. In a manner similar to that described above, the current flowing through phase B continues to flow after switch $S_B$ is opened. Because of the current path provided by the present invention, this continued current is permitted to flow through diode D2 to charge capacitor C3 and raise the voltage potential at connection point 206 above that which would be expected if the current path through diode D2 was not provided. This increased voltage potential at connection point 206 is represented by the bulge shown extending above dashed line $V_M$ in the timing diagram identified as $V_S(B)$ in FIG. 6. That bulge continues as current begins to flow through phase winding C as a result of the increased voltage potential across points 206 and 212 in FIG. 5. It should be understood that the horizontal dashed lines in FIG. 6 represent the motor operating voltage $V_M$ provided by the voltage source 216 in FIG. 5.

The continued operation of the circuit in FIG. 5, according to the timing diagrams in FIG. 6, will not be further discussed other than to state that the sequence described above will continue as each switch is sequentially closed and opened. In general terms, the current flowing through each closed switch in FIG. 5 will be diverted through an associated diode conduction path when the associated switch is opened. That diverted current will flow to a capacitor, such as capacitor C2, and charge that capacitor as the energy is stored for later use by a subsequently energized stator winding. The increased voltage potential provided by the stored energy will assist in the initiation of current flow through the next stator winding to be energized.

The timing diagrams in FIG. 6 assume that each switch is closed at a time generally coincident and simultaneous with the opening of the previous switch. However, it should be clearly understood that this precise timing coincidence between the opening of one switch and the closing of another is not a requirement of operation necessitated by the present invention. Instead, it is a sequential operation that depends upon the particular switched reluctance motor connected to the present invention and the precise operating characteristics of the motor that are desired. Alternatively, the switches could be operated in an overlapping timing sequence or a period of time could be provided between the opening of one switch and the closing of the next switch. These details of operation are not directly related to or necessitated by the scope of the present invention.

Figure 7:
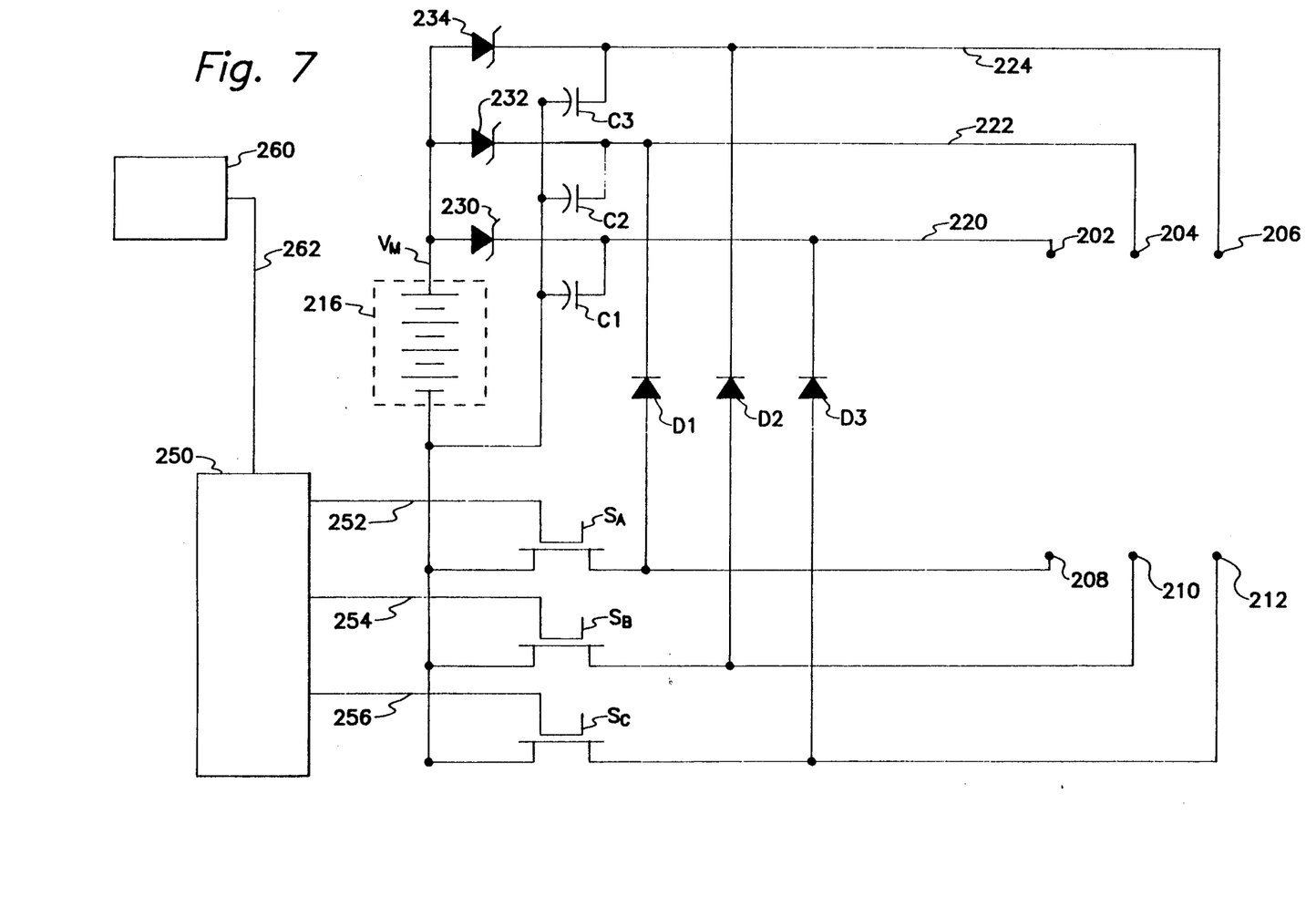
FIG. 7 shows the control circuit of FIG. 5 without the associated switched reluctance motor.

FIG. 7 illustrates the present invention that is shown in FIG. 5, but without the switched reluctance motor 200 or its phase windings. The purpose of FIG. 7 is to specifically illustrate and emphasize the scope of the present invention. The control circuit of the present invention comprises connection points 202, 204 and 206 which, in turn, provide a means for connecting first ends of stator windings to a voltage source 216 through electrical conductors 220, 222 and 224, respectively. These connecting means include Zener diodes, 230, 232 and 234. Connection points 208, 210 and 212 provide means for connecting the second ends of stator windings to a point of ground potential at the voltage source 216 or another suitable ground potential point. The switches, $S_A$, $S_B$ and $S_C$, provide a means for alternately connecting and disconnecting the second ends of the stator windings to the ground potential. The conductors shown with diodes D1, D2 and D2 connected in electrical communication with them, provide a means for conducting a current from the second ends of the stator windings to first ends of other stator windings. Capacitors, C1, C2 and C3, provide a means for storing energy when current is caused to flow through the diodes in FIG. 7. As described above, that continued current results from the inductive characteristic of the stator windings which resists the sudden cessation of current flow when the voltage potential is disconnected from across the first and second ends of the stator windings. The circuit in FIG. 7 is intended to be connected to a switched reluctance motor for the purpose of controlling the operation of that motor. The control circuit 250 controls the operation of solid state switches $S_A$, $S_B$ and $S_C$ on lines 252, 254 and 256, respectively, in response to a predefined sequence of operation which is not restricted to any particular algorithm by the present invention. The control circuit 250 also responds to signals on line 262 from the rotor position sensor 260. However, it should be understood that the present invention does not require any particular type of rotor position sensor or, for that matter, any direct sensor at all. Instead, the present invention could operate with equal effectiveness with an indirect type of technique for sensing the position of the rotor.

Figure 8:
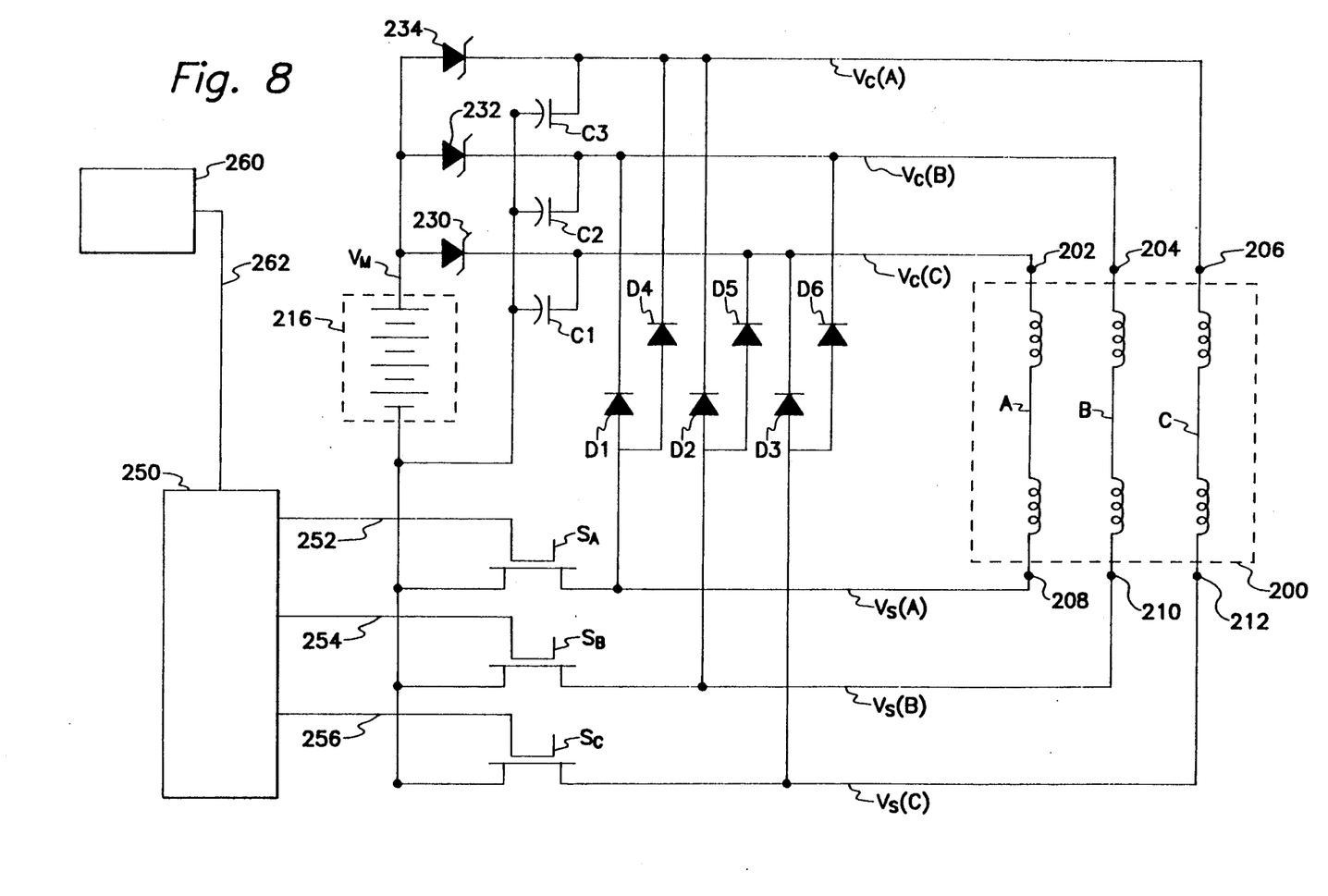
FIG. 8 shows an alternative embodiment of the present invention.

FIG. 8 illustrates an alternative embodiment of the present invention. For purposes of describing this alternative embodiment shown in FIG. 8, FIGS. 5 and 8 will be compared. The circuit shown in FIG. 8 is virtually identical to that shown in FIG. 5 with the exception that additional diodes, D4, D5 and D6, are provided. The purpose of these additional diodes is to permit current to flow from each of the second ends of the stator windings to the first ends of two associated windings instead of only flowing to the first end of one other associated winding, as provided in the circuit of FIG. 5. In other words, when switch $S_A$ is opened after having been closed, the current that continues to flow through phase winding A, because of its inductive characteristic, will flow through connection point 208 and, because of the opened switch status of switch $S_A$, will then flow through diodes D1 and D4 to capacitors C2 and C3, respectively. When switch $S_A$ is opened, the current that continues to flow through phase winding A, because of its inductive characteristic, charges both capacitors C2 and C3 and, as a result, raises the voltage potential at connection points 204 and 206 for the purpose of assisting the initialization of current flow through either of those two phase windings.

It should be understood that, although not specifically shown in FIG. 6, the switches $S_A$, $S_B$ and $S_C$ can be rapidly opened and closed during the periods where they are shown continually closed in the timing diagrams. This results from the fact that many control algorithms close the appropriate switch until the current flowing through the associated winding rises above a predetermined limit. Then the switch is briefly opened until the current falls to another predetermined limit. This generally rapid change of status, during the periods when the timing diagrams show the switches being continuously closed, can provide brief currents flowing to the associated capacitors with corresponding voltage rises as those capacitors store this energy. For purposes of simplicity, these brief periods of open switch status and corresponding capacitor voltage changes are not illustrated.

Figure 9:
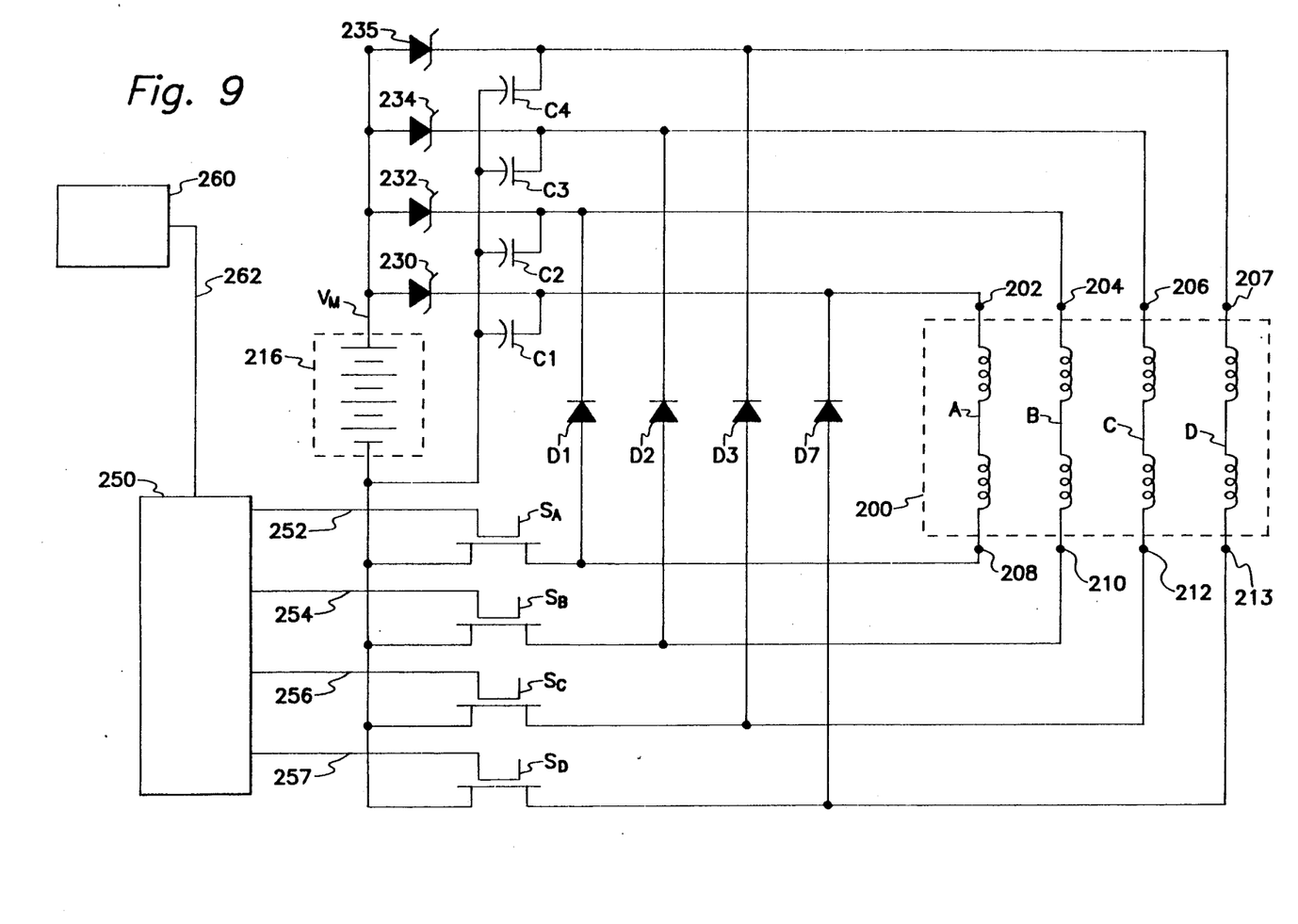
FIG. 9 is an alternative embodiment of the present invention adapted for use with a four phase switched reluctance motor.

FIG. 9 illustrates the present invention associated with a switched reluctance motor 200 that comprises four phases or pairs of stator windings. The purpose of FIG. 9 is to illustrate the fact that the concept of the present invention is not limited to association with a particular number of phase windings, but, instead, is equally adaptable for any number of phases in a switched reluctance motor. Comparing FIGS. 5 and 9, it can be seen that an additional diode, D7 is provided to connect stator winding pair D in electrical communication with the circuit of the present invention in a manner generally similar to the way phase windings A, B and C are connected. Switch $S_D$ is provided to connect and disconnect the second end 213 of stator winding D in electrical communication with a connection point of ground potential at the voltage source 216. The first end 207 of stator winding D is connected in electrical communication with the voltage source 216, through Zener diode 235, as shown. In addition, capacitor C4 is connected in electrical communication with the first end 207 of stator winding D. Diode D7 provides means for conducting an electrical current from the second end 213 of the stator winding D to the first end, 202, of stator winding A in a manner described above in association with FIG. 5.

Although the present invention has been described with considerable detail and illustrated with significant specificity, and illustrated with several particular embodiments, it should be understood that the present invention is not limited to those particular embodiments and additional alternative embodiments of the present invention should be considered within the scope of the claims.

The embodiments of the invention in which an exclusive property or right is claimed are defined as follows:

1. A control circuit for a switched reluctance dynamoelectric machine, comprising:
   first means for connecting a first end of a first stator winding in electrical communication with a voltage source;
   second means for connecting a first end of a second stator winding in electrical communication with said voltage source;
   first means for alternately connecting and disconnecting a second end of said first stator winding to a ground potential;
   second means for alternatively connecting and disconnecting a second end of said second stator winding to said ground potential;
   first means for conducting an electrical current from said second end of said first stator winding to said first end of said second stator winding, said first conducting means providing continuous electrical communication between said second end of said first stator winding and said first end of said second stator winding; and
   first means for storing a voltage potential at a circuit point in electrical communication with said first end of said second stator winding.

2. The control circuit of claim 1, further comprising:
   a first Zener diode connected in electrical communication between said first end of said first stator winding and said voltage source; and
   a second Zener diode connected in electrical communication between said first end of said second stator winding and said voltage source.

3. The control circuit of claim 1, further comprising:
   a first diode connected in electrical communication with said first conducting means between said second end of said first stator winding and said first end of said second stator winding.

4. The control circuit of claim 1, further comprising:
   third means for connecting a first end of a third stator winding in electrical communication with said voltage source;
   third means for alternately connecting and disconnecting a second end of said third stator winding to said ground potential;
   second means for conducting an electrical current from said second end of said second stator winding to said first end of said third stator winding; and
   second means for storing a voltage potential at a circuit point in electrical communication with said first end of said third stator winding.

5. The control circuit of claim 4, further comprising:
   third means for conducting an electrical current from said second end of said third stator winding to said first end of said first stator winding; and
   third means for storing a voltage potential at a circuit point in electrical communication with said first end of said first stator winding.

6. The control circuit of claim 4, further comprising:
   a third Zener diode connected in electrical communication between said first end of said third stator winding and said voltage source.

7. The control circuit of claim 4, further comprising:
   a second diode connected in electrical communication with said second conducting means between said second end of said second stator winding and said first end of said third stator winding.

8. The control circuit of claim 5, further comprising:
   a third diode connected in electrical communication with said third conducting means between said second end of said third stator winding and said first end of said first stator winding.

9. A circuit for controlling a switched reluctance motor, comprising:

a first connection point, said first connection point being connected to a first terminus of a first stator winding;

a second connection point, said second connection point being connectable to a second terminus of said first stator winding;

a third connection point, said third connection point being connectable to a first terminus of a second stator winding;

a fourth connection point, said four connection point being connectable to a second terminus of said second stator winding;

a first means for connecting said first and third connection points to a voltage source;

second means for connecting and disconnecting said second connection point with said ground potential; and third means for connecting and disconnecting said fourth connection point with said ground potential; and means for conducting an electrical current from said second connection point to said third connection point, said conducting means providing continuous electrical communication between said second connection point and said third connection point.

10. The circuit of claim 9, further comprising:
means for storing a voltage potential, said storing means being connected to said third connection point.

11. The circuit of claim 10, further comprising:
a first Zener diode connected between said first connection point and said voltage source; and
a second Zener diode connected between said third connection point and said voltage source.

12. The circuit of claim 11, further comprising:
a fifth connection point, said fifth connection point being connectable to a first terminus of a third stator winding;
a sixth connection point, said sixth connection point being connectable to a second terminus of said third stator winding;
fourth means for connecting said fifth connector point to said voltage source;
fifth means for connecting and disconnecting said sixth connection point with said ground potential;

means for conducting an electrical from said fourth connection point to said fifth connection point.

13. A method for controlling a switched reluctance dynamoelectric machine, comprising:
connecting a first end of a first stator winding in electrical communication with a voltage source;
connecting a first end of a second stator winding in electrical communication with said voltage source;
alternately connecting and disconnecting a second end of said first stator winding to a ground potential;
alternatively connecting and disconnecting a second end of said second stator winding to said ground potential;
conducting an electrical current directly from said second end of said first stator winding to said first end of said second stator winding by providing, in parallel with said voltage source, a continuous connection between said second end of said first stator winding and said first end of said second stator winding; and
storing a voltage potential resulting from said electrical current at a circuit point in electrical communication with said first end of said second stator winding.

14. The method of claim 13, further comprising:
connecting a first end of a third stator winding in electrical communication with said voltage source;
alternately connecting and disconnecting a second end of said third stator winding to said ground potential;
conducing an electrical current from said second end of said second stator winding to said first end of said third stator winding; and
storing a voltage potential at a circuit point in electrical communication with said first end of said third stator winding.

15. The method of claim 14, further comprising:
conducting an electrical current from said second end of said third stator winding to said first end of said first stator winding; and
storing a voltage potential at a circuit point in electrical communication with said first end of said first stator winding.

* * * * *